United States Patent [19]

Ridyard

[11] 4,039,528
[45] Aug. 2, 1977

[54] SULPHONIC ACID-, HYDROXY-SUBSTITUTED PHENYL AZO-NAPHTHYL AZO-N-ARYL AMINO DYES

[75] Inventor: Denis Robert Annesley Ridyard, Manchester, England

[73] Assignee: Imperial Chemical Industries Limited, London, England

[21] Appl. No.: 638,279

[22] Filed: Dec. 5, 1975

Related U.S. Application Data

[63] Continuation of Ser. No. 433,538, Jan. 15, 1974, abandoned, which is a continuation of Ser. No. 53,633, July 9, 1970, abandoned.

[30] Foreign Application Priority Data

July 17, 1969   United Kingdom ............... 36096/69

[51] Int. Cl.² ............................................. C09B 31/04
[52] U.S. Cl. ..................................... 260/190; 260/191
[58] Field of Search ............... 260/174, 177, 185, 190, 260/191

[56] References Cited

U.S. PATENT DOCUMENTS

| | | | |
|---|---|---|---|
| 2,391,179 | 12/1945 | McNally et al. ...................... | 260/187 |
| 3,096,140 | 7/1963 | Gaetani ............................ | 260/190 X |
| 3,580,901 | 5/1971 | Feeman ............................ | 260/191 |
| 3,676,050 | 7/1972 | James .............................. | 260/190 X |
| 3,814,749 | 6/1974 | Feeman ............................ | 260/177 X |

OTHER PUBLICATIONS

Colour Index, 2nd Ed., vol. 3, 1956, p. 3210.
Colour Index, 2nd Ed., vol. 3, 1956, p. 3143.
Lubs, "The Chemistry of Synthetic Dyes & Pigments," Reinhold Publishing Corp., New York, 1955, pp. 670–671.

*Primary Examiner*—Charles F. Warren
*Attorney, Agent, or Firm*—Cushman, Darby & Cushman

[57] ABSTRACT

A disazo dyestuff has the formula

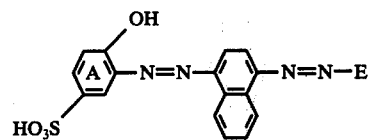

wherein the sulphonic acid group in ring A is in meta or para position relative to the hydroxy group and E represents

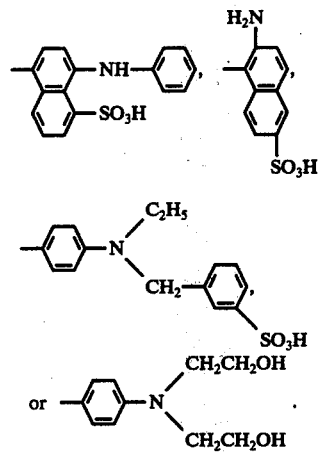

The dyestuff gives navy blue to violet shades on synthetic polyamide textile materials.

1 Claim, No Drawings

SULPHONIC ACID-, HYDROXY-SUBSTITUTED PHENYL AZO-NAPHTHYL AZO-N-ARYL AMINO DYES

This is a continuation, of application Ser. No. 433,538 now abandoned filed Jan. 15, 1974 which in turn is a Cont. of Ser. No. 53,633 filed July 9, 1970, now abandoned.

This invention relates to disazo dyestuffs and their application to textile materials.

According to the invention there are provided disazo dyestuffs having the general formula:

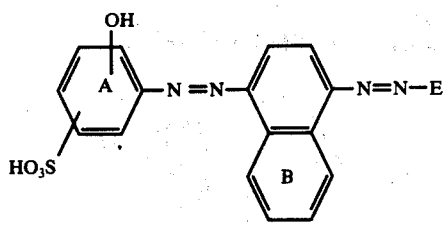

wherein E is the residue of an amino group containing coupling component of the benzene or naphthaline series, the sulphonic acid group in ring A is in a meta or para position relative to the azo group and ring B may optionally be substituted by sulphonic acid and/ or hydroxyl, said dyestuffs containing not more than three sulphonic acid groups.

The hydroxyl group in ring A is preferably in the 2-position and the sulphonic acid group in the 4- or 5-position relative to the azo group. Whilst the dyestuffs may contain from one to three sulphonic acid groups, the preferred dyestuffs contain two such groups.

The dyestuffs of the invention may be prepared by diazotizing a primary amine of the formula:

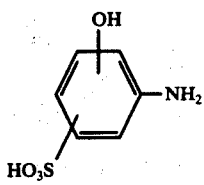

wherein the sulphonic acid group is in a meta or para position relative to the amino group, coupling with an aminonaphthaline of the formula:

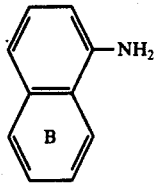

wherein ring B may optionally be substituted by sulphonic acid and/or hydroxyl and then diazotizing the aminomonoazo compound and coupling with an amino group containing coupling component of the benzene or naphthalene series.

Suitable aminonaphthalenes for use in the preparation of the dyestuffs of the invention include a-naphthylamine, 1-amino-naphthalene-5-, 6- or 7-sulphonic acid and 1-amino-5-hydroxy-naphthalene-7-sulphonic acid.

Suitable amino group containing coupling components of the benzene or naphthalene series include compounds having the following structures:

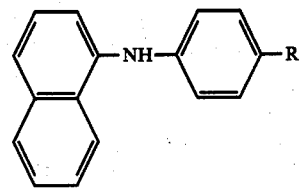

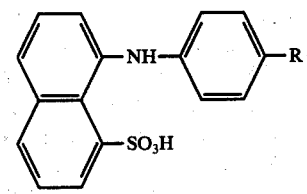

wherein R represents hydrogen, lower alkyl or lower alkoxy.

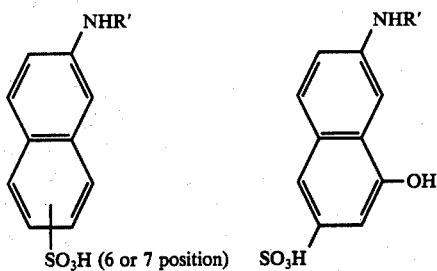

wherein R' represents hydrogen, alkyl or aryl,

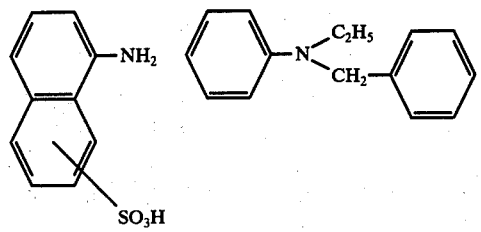

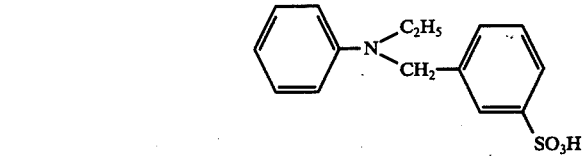

The dyestuffs of the present invention are particularly suitable for applying to synthetic polyamide textile materials, for example nylon 66, nylon 6 and nylon 11, using any of the general methods known for the application of acid dyestuffs to such materials. The dyestuffs give navy blue and other colorations having a high degree of fastness to wet treatments and to light.

The invention is illustraated but not limited by the following examples in which all parts are by weight.

EXAMPLE 1

A solution of 7.8 parts of 2-aminophenol-4-sulphonic acid in 100 parts of water and 20 parts of 2N sodium carbonate solution is acidified with 12 parts of 36% aqueous hydrochloric acid cooled to 0–5° C., and diazotized by the addition of a solution of 2.8 parts of nitrite in 20 parts of water.

A solution of 5.7 parts of a-naphtyylamine in 100 parts of water and 6 parts of 36% aqueous hydrochloric acid is added to the stirred diazo solution during 30 minutes at 0–5° C. After stirring for a further 14 hours at 0–5° C. the monoazo dyestuff is filtered off, washed with 5% brine solution and dried.

A solution of 4.1 parts of the above aminomonoazo dyestuff in 100 parts of water and 3 parts of 10N sodium hydroxide solution is cooled to 0–5° C. and a solution of 1.4 parts of sodium nitrite in 10 parts of water is added, followed by 30 parts of sodium chloride and 10 parts of 36% aqueous hydrochloric acid. The suspension is stirred for a further 3 hours at 0–5° C. and the solid diazomonoazo dyestuff is filtered off, washed with cold 5% brine solution and suspended in 100 parts of water at 0–5° C. The suspension is added to a solution of 3.2 parts of the sodium salt of 1 phenyl-aminonaphthalene-8-sulphonic acid in 200 parts of water during 15 minutes at 0–5° C. After stirring for a further 14 hours at 0–5° C., 40 parts of sodium chloride are added. The diazo dyestuff is filtered off, washed with 10% brine solution and dried.

0.065 Part of the above disazo dyestuff and 0.15 part of ammonium acetate are dissolved in 0.03 part of acetic acid and 150 parts of water. 5 parts of bulked nylon 66 fabric are introduced into this dyebath and agitated while the temperature of the bath is raised to 100° C. The temperature is maintained at 100° C. for 1 hour. A greenish navy blue dyeing is obtained which has excellent fastness to wet treatments and to light.

In place of 2-aminophenol-4-sulphonic acid there may be used 2- aminophenol-5-sulphonic acid when a dyestuff with similar properties is obtained.

EXAMPLE 2

When the 3.2 parts of 1-phenylaminonaphthalene-8-sulphonic acid of Example 1 are replaced by 2.7 parts of 2aminonaphthalene-6-sulphonic acid a dyestuff is obtained which dyes nylon in reddish-navy shades with good wet fastness properties.

EXAMPLE 3

When the 3.2 parts of 1-phenylaminonaphthalene-8-sulphonic acid of Example 1 are replaced by 3.1 parts of N-benzyl-N-ethylaniline-3'-sulphonic acid a violet dyestuff is obtained which has excellent wet fastness properties on nylon.

EXAMPLE 4

When the 3.2 parts of 1-phenylaminonaphthalene-8-sulphonic acid of Example 1 are replaced by 1.7 parts of N,N-bis-β-hydroxyethylaniline a dyestuff is obtained which dyes nylon in violet shades with good wet fastness properties.

I claim:

1. A disazo dyestuff of the formula

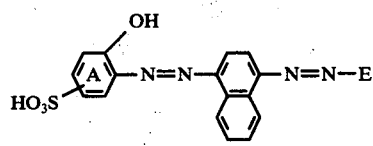

wherein the sulphonic acid group in ring A is in meta or para position relative to the hydroxy group and E represents a member selected from the group consisting of

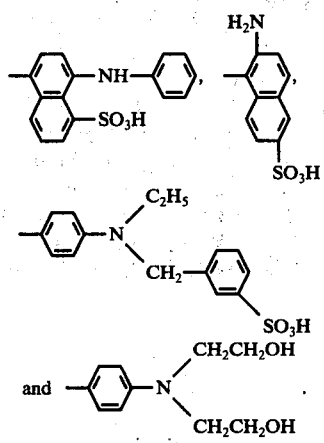

* * * * *